Dec. 11, 1945.   J. F. MORSE   2,390,894

FILM SPOOL

Filed Aug. 2, 1944

Inventor
JOHN F. MORSE

By  Ely & Frye

Attorneys

Patented Dec. 11, 1945

2,390,894

UNITED STATES PATENT OFFICE 2,390,894

FILM SPOOL

John F. Morse, Hudson, Ohio

Application August 2, 1944, Serial No. 547,755

8 Claims. (Cl. 242—74)

The present invention relates to a new and improved design of spool or reel such as is used for developing photographic films, although it is not restricted to that purpose as the invention may be used in any field in which it is desired to clamp the end of a ribbon or film to a spool.

The object of the invention is to provide a spool which has a simple and effective means for clamping the end of the film so that it will be securely held without possibility of tearing the film. Spools of this type are especially designed for use in mechanically or manually operated developing tanks in which the spools are driven alternately in reverse directions for passing the film back and forth through a developing or fixing bath. In manually operated machines of this character the operator has no opportunity to observe visually when the film has been completely unwound from one spool and relies solely upon the resistance of the film to further travel to ascertain when it has reached the end of its travel in one direction. In automatic winding and rewinding machines, the resistance of the film is often relied upon to reverse the winding mechanism, and unless the film is securely clamped to the spool, the reversing mechanism will not function. For either type of machine it is necessary that the ends of the films be firmly anchored to the spools, otherwise the film will free itself from the spool at the end of its travel.

The construction shown and described herein will grip the end of the film so securely that it cannot be freed by pulling on the film, indeed the greater the force exerted upon the film, the more securely will it be clamped. The film is gripped so that there will be no tendency for the film to tear. The construction is simple and economical, and the major parts of the spool are so designed that they may be made from any of the standard plastic materials such as are commonly available.

The preferred form of the invention is shown and described herein, but it will be understood that changes and variations may be made therein without departing from the invention. In the drawing.

Figure 1:
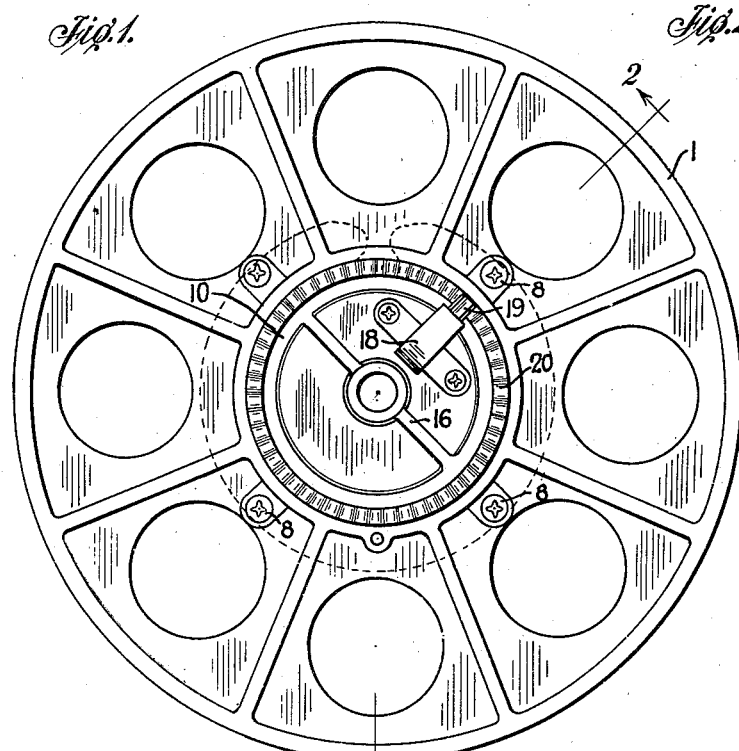
Fig. 1 is a side elevation of a complete spool embodying the invention.
Figure 2:
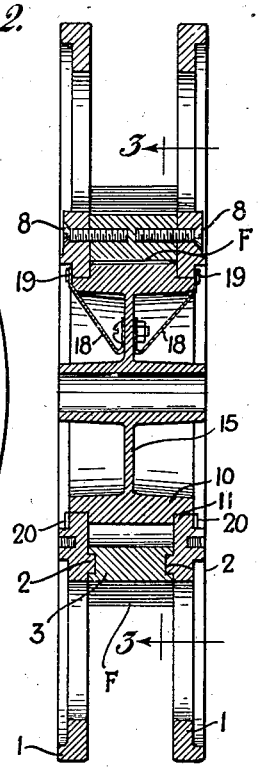
Fig. 2 is a cross section on the line 2—2 of Fig. 1.
Figure 3:
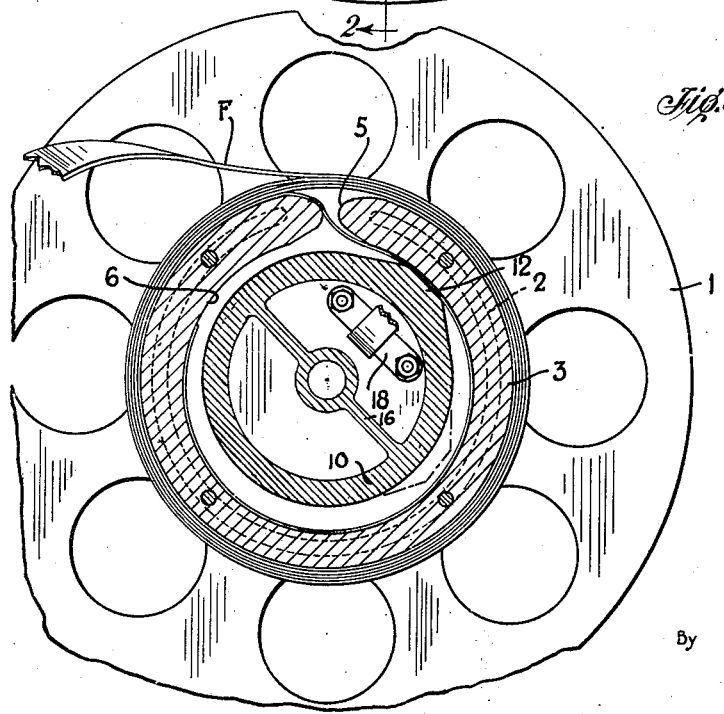
Fig. 3 is a cross section on the line 3—3 of Fig. 2 in which the clamping element is shown in full line in film gripping position.

The spool comprises two oppositely positioned annular side plates 1 made of a molded plastic material and strengthened by external flanges and radial ribs in any suitable design for lightness and strength. On the inner face of each of the side plates and near the inner periphery thereof is a rib 2 which extends around the central opening to the extent shown in dotted lines in Fig. 3 so that a gap is provided therein at one point. This rib is for the purpose of holding the central plastic core member 3 which is correspondingly grooved on its lateral faces to receive the ribs 2 and thereby position and hold the parts in their assembled condition. The core member as shown in Fig. 3 is an almost complete ring, being formed with a gate or opening 5 which registers with the gap in the rib 2 and through which the end of the film F is passed into the space within the interior of the core. As will be seen in Fig. 3, the inner surface or wall 6 of the core is not a true circle but is eccentric to the axis of the spool and gradually diverges on either side of the gap 5 to constitute a cam locking surface against and on which the end of the film is gripped by the rotating lock or clamp to be described. When the two side flanges and the central core member are assembled they are held by a series of screws 8.

Located within the chamber formed by the hollow core member and the inner edges of the spool flanges or plates is the rotatable lock or clamp referred to. This member is indicated by the numeral 10 and is also made of plastic material. The member fits within the chamber and can be rotated therein, being guided for this purpose by angular recesses 11 on its outer edge which fit the inner edges of the spool flanges. The outer rim of the rotating clamp will clear the inner surface of the core except at the point indicated by the numeral 12 where there is provided an enlargement or cam surface which is so proportioned that when the clamp is rotated to cause the surface 12 to approach the gap 5, it will come in contact with the inner surface of the core, as shown in full lines in Fig. 3. When turned in the direction shown by the arrow, the cam 12 will free itself of the inner wall of the core as shown in dotted lines in Fig. 3. The clamp 10 is preferably formed with a central web 15 and a cross rib 16 which latter affords a grip by which the clamp may be rotated.

When the operator desires to attach a film to the spool, the rotating clamp is moved to the dotted line position and the end of the film inserted through the gap 5 until it lies against the inner surface of the core. The clamp is then rotated to the full line position which securely grips the end of the film. It will be noted that any pull exerted on the film will tend to move the clamp toward the gap and in firmer engagement with the inner wall of the core 3.

In order to prevent accidental movement of the clamp in reverse or unlocking direction, a pair of light spring detents is provided. Each of these detents, indicated by the numeral 18, is attached to the web 15, its outer end being cupped so as to provide a rounding finger 19 which rides over an undulating surface 20 formed on the inner edge of the adjacent spool flange 1. The arrangement offers sufficient resistance to the accidental release of the film, but permits the clamp to be rotated by the operator when desired for clamping or releasing the film.

It will be seen that a simple and effective arrangement has been provided for the purposes outlined above. It will be understood that the invention is not limited to the photographic film field, but may be used wherever a web or ribbon is mounted on a spool or body to which its end should be firmly anchored.

What is claimed is:

1. A spool for the uses and purposes set forth comprising two spool flanges, a hollow core member between the flanges, said core member being provided with a gap leading to the interior of the core, and a clamp located within the core and rotatable upon the axis of the core, said clamp having a surface which is movable by rotation of the clamp into and out of contact with the inner wall of the core member.

2. A spool for the uses and purposes set forth comprising two spool flanges, a hollow core between the flanges, said core being provided with a gap communicating with its interior, and a clamp rotatable upon the axis of the core and having a surface which is movable by rotation of the clamp into contact with a portion of the inner wall of the core.

3. A spool for the uses and purposes set forth comprising two spool flanges, a hollow core between the flanges, said core being provided with a gap communicating with the interior of the core, the inner wall of the core having a surface which is eccentric to the axis of the spool, and a clamp within the core and rotatable on the axis of the spool, said clamp having a surface which is movable by rotation of the clamp into and out of contact with the inner wall of the core.

4. A spool for the uses and purposes set forth comprising two annular spool flanges, a hollow core between the flanges, said core being provided with a gap communicating with the interior of the core, the inner wall of the core having a surface which is eccentric to the axis of the spool, and a clamping member rotatably mounted on the inner edges of the spool flanges, said clamping member having a cam projection which is movable into contact with the inner wall of the core by rotation of the member.

5. A spool for the uses and purposes set forth comprising two spool flanges, a hollow core between the flanges, said core being provided with a gap communicating with the interior of the core, the inner wall of the core having a surface which is eccentric to the axis of the spool, a clamp within the core and rotatable on the axis of the spool, said clamp having a surface which is movable by rotation of the clamp into and out of contact with the inner wall of the core, and a detent to hold the clamp from accidental rotation.

6. A spool for the uses and purposes set forth comprising two annular spool flanges, a hollow core between the flanges, said core being provided with a gap communicating with the interior of the core, the inner wall of the core having a surface which is eccentric to the axis of the spool, a clamping member rotatably mounted on the inner edges of the spool flanges, said clamping member having a cam projection which is movable into contact with the inner wall of the core by rotation of the member, and a spring detent to hold the clamping member.

7. In a device of the character described two spaced annular spool flanges, a ring shaped core, means to hold the core and the flanges together, said core being provided with a passage to its interior and having its inner surface formed eccentrically to the axis of the spool, a rotatable clamp mounted on the inner edges of the spool flanges, said clamp having an enlarged portion which is movable by rotation of the clamp into and out of engagement with the inner surface of the core.

8. In a device of the character described two spaced annular spool flanges, a ring shaped core, means to hold the core and the flanges together, said core being provided with a passage to its interior and having its inner surface formed eccentrically to the axis of the spool, a rotatable clamp mounted on the inner edges of the spool flanges, said clamp having an enlarged portion which is movable by rotation of the clamp into and out of engagement with the inner surface of the core, and a detent to hold the clamp from accidental rotation.

JOHN F. MORSE.